United States Patent [19]

Turner

[11] Patent Number: 4,791,180

[45] Date of Patent: Dec. 13, 1988

[54] NEW POLYMERIZATION CATALYST

[75] Inventor: Howard W. Turner, Webster, Tex.

[73] Assignee: Exxon Chemical Patents Inc., Linden, N.J.

[21] Appl. No.: 101,871

[22] Filed: Sep. 28, 1987

Related U.S. Application Data

[60] Division of Ser. No. 16,316, Feb. 19, 1987, Pat. No. 4,752,597, which is a continuation of Ser. No. 808,419, Dec. 12, 1985, abandoned.

[51] Int. Cl.$^4$ .............. C08F 4/62; C08F 4/64; C08F 4/68
[52] U.S. Cl. .................. 526/160; 526/352; 502/103
[58] Field of Search .............. 502/103, 104, 117; 526/160

[56] References Cited

U.S. PATENT DOCUMENTS

| | | | |
|---|---|---|---|
| 3,242,099 | 3/1966 | Manyik et al. | 502/117 |
| 4,404,344 | 9/1983 | Sinn et al. | 526/160 |
| 4,530,914 | 7/1985 | Ewen et al. | 526/160 X |
| 4,542,199 | 9/1985 | Kaminsky et al. | 526/160 |
| 4,564,647 | 1/1986 | Hayashi et al. | 526/160 X |
| 4,658,078 | 4/1987 | Slaugh et al. | 502/117 X |
| 4,665,047 | 5/1987 | Slaugh et al. | 502/117 X |

FOREIGN PATENT DOCUMENTS 129368 12/1984 European Pat. Off. ............ 526/160

Primary Examiner—Patrick P. Garvin
Attorney, Agent, or Firm—C. E. Smith; M. B. Kurtzman

[57] ABSTRACT

An olefin polymerization catalyst comprising the reaction product of a metallocene complex of Group IVB, VB, VIb, and VIII of the Periodic Table and an excess of alumoxane.

8 Claims, No Drawings

NEW POLYMERIZATION CATALYST

This is a division of application Ser. No. 016,316, filed 2, 1987, and now U.S. Pat. No. 4,752,597, which is a continuation of application Ser. No. 808,419, filed 12, 12, 1985, and now abandoned.

This invention relates to a new composition of matter which is useful as a catalyst for the polymerization and copolymerization of olefins and particularly useful for the polymerization of ethylene and copolymerization of ethylene with 1-olefins having 3 or more carbon atoms such as, for example, propylene, i-butene, 1-butene, 1-pentene, 1-hexene, and 1-octene; dienes such as butadiene, 1,7-octadiene, and 1,4-hexadiene or cyclic olefins such as norbornene. The invention particularly relates to a new transition metal containing composition of matter which can be employed as an olefin polymerization catalyst without the use of an organometallic cocatalyst. The invention further generally relates to the method of preparing the new composition of matter and to a process for polymerization of ethylene alone or with other 1-olefins or diolefins in the presence of the new transition metal containing catalyst comprising the reaction product of a metallocene and an alumoxane.

DESCRIPTION OF THE PRIOR ART

Traditionally, ethylene and 1-olefins have been polymerized or copolymerized in the presence of hydrocarbon insoluble catalyst systems comprising a transition metal compound and an aluminum alkyl. More recently, active homogeneous catalyst systems comprising a bis(cyclopentadienyl)titanium dialkyl or a bis(cyclopentadienyl)zirconium dialkyl, an aluminum trialkyl and water have been found to be useful for the polymerization of ethylene. Such catalyst systems are generally referred to as "Ziegler-type catalysts".

German patent application 2,608,863 discloses the use of a catalyst system for the polymerization of ethylene consisting of bis (cyclopentadienyl) titanium dialkyl, aluminum trialkyl and water.

German patent application 2,608,933 discloses an ethylene polymerization catalyst system consisting of zirconium metallocenes of the general formula (cyclopentadienyl)$_n$ZrY$_{4-n}$, wherein n stands for a number in the range of 1 to 4, Y for R, CH$_2$AlR$_2$. CH$_2$CH$_2$AlR$_2$ and CH$_2$CH(AlR$_2$)$_2$, wherein R stands for alkyl or metallo alkyl, and an aluminum trialkyl cocatalyst and water.

European patent application No. 0035242 discloses a process for preparing ethylene and atactic propylene polymers in the presence of a halogen-free Ziegler catalyst system of (1) cyclopentadienyl compound of the formula (cyclopentadienyl)$_n$MeY$_{4-n}$ in which n is an integer from 1 to 4, Me is a transition metal, especially zirconium, and Y is either hydrogen, a $C_1$-$C_5$ alkyl or metallo alkyl group or a radical having the following general formula CH$_2$AlR$_2$, CH$_2$CH$_2$AlR$_2$ and CH$_2$CH(AlR$_2$)$_2$ in which R represents a $C_1$-$C_5$ alkyl or metallo alkyl group, and (2) an alumoxane.

Additional teachings of homogeneous catalyst systems comprising a metallocene and alumoxane are European Patent Application 0069951 of Kaminsky et al, U.S. Pat. No. 4,404,344 issued Sept. 13, 1983 of Sinn et al., and U.S. Pat. Nos. 697,308 filed Feb. 1, 1985, Pat. No. 501,588 filed May 27, 1983 and now Pat. No. 4,522,982, Pat. No. 728,111 filed Apr. 29, 1985 and Pat. No. 501,740 filed June 6, 1983 and now Pat. No. , 4,530,914, each commonly assigned to Exxon Research and Engineering Company.

An advantage of the homogeneous catalyst system comprising a metallocene and an alumoxane is the very high activity obtained for ethylene polymerization. Another significant advantage is, unlike olefin polymers produced in the presence of conventional heterogeneous Ziegler catalysts, terminal unsaturation is present in polymers produced in the presence of these homogeneous catalysts. Nevertheless, the catalysts suffer from a disadvantage, that is, the ratio of alumoxane to metallocene is high, for example in the order of 1,000 to 1 up to as high as $10^6$:1. Such voluminous amounts of alumoxane would require extensive treatment of obtained polymer product in order to remove the undesirable aluminum. A second disadvantage of the homogeneous catalyst system, which is also associated with traditional heterogeneous Ziegler catalysts, is the multiple of delivery systems required for introducing the individual catalyst components into the polymerization reactor. A third disadvantage is the high costs of the alumoxane.

It would be highly desirable to provide a metallocene based catalyst which is commercially useful for the polymerization of olefins wherein the aluminum to transition metal ratio is within respectable ranges and further to provide a polymerization catalyst which does not require the presence of a cocatalyst thereby reducing the number of delivery systems for introducing catalyst into polymerization reactor.

SUMMARY OF THE INVENTION

In accordance with the present invention, a new composition of matter comprising a metallocene-alumoxane reaction product is provided which is useful as a catalyst for olefin polymerization and particularly useful for the production of low, medium and high density polyethylenes and copolymers of ethylene with alphaolefins having 3 to 18 or more carbon atoms and/or diolefins having up to 18 carbon atoms or more.

The new composition of matter provided in accordance with one embodiment of this invention, comprises the reaction product of at least one metallocene and an excess of alumoxane thereby providing a metallocene-alumoxane reaction product. In accordance with another embodiment of this invention, a metallocene-alumoxane catalyst which can be usefully employed is provided as the sole catalyst component in an olefin polymerization process.

The reaction product will polymerize olefins at commercially respectable rates without the presence of the objectionable excess of alumoxane as required in the homogenous system.

In yet another embodiment of this invention there is provided a process for the polymerization of ethylene and other olefins, and particularly homopolymers of ethylene and copolymers of ethylene and higher alphaolefins and/or diolefins and/or cyclic olefins such as norbornene in the presence of the new catalysts.

The metallocenes employed in the production of the reaction product are organometallic compounds which are cyclopentadienyl derivatives of a Group IVB, VB, VIB or VIII metal of the Periodic Table (66th Edition of Handbook of Chemistry and Physics, CRC Press [1985–86] CAS version) and include mono, di and tricyclopentadienyls and their derivatives of the transition metals. Particularly desirable are metallocene complexes of a Group IVB and VB metal such as titanium, zirconium, hafnium and vanadium. The alumoxanes employed in forming the reaction product with the metallocenes are themselves the reaction products of an aluminum trialkyl with water.

The alumoxanes are well known in the art and comprise oligomeric linear and/or cyclic alkyl alumoxanes represented by the formula:

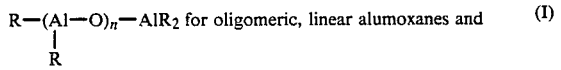  (I)

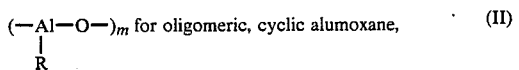  (II)

wherein n is 1–40, preferably 10–20, m is 3–40, preferably 3–20 and R is a $C_1$–$C_8$ alkyl group and preferably methyl. Generally, in the preparation of alumoxanes from, for example, aluminum trimethyl and water, a mixture of linear and cyclic compounds is obtained.

The alumoxanes can be prepared in a variety of ways. Preferably, they are prepared by contacting water with a solution of aluminum trialkyl, such as, for example, aluminum trimethyl, in a suitable organic solvent such as benzene or an aliphatic hydrocarbon. For example, the aluminum alkyl is treated with water in the form of a moist solvent. In a preferred method, the aluminum alkyl, such as aluminum trimethyl, can be desirably contacted with a hydrated salt such as hydrated ferrous sulfate. The method comprises treating a dilute solution of aluminum trimethyl in, for example, toluene with ferrous sulfate heptahydrate.

PREFERRED EMBODIMENTS

Briefly, the new transition metal containing composition of matter of the present invention is obtained by reacting an excess of alumoxane with at least one metallocene in the presence of a suitable solvent. The reaction product can be employed as the sole catalyst component for the polymerization of olefins or it can be employed in combination with other catalyst systems such as, for example, titanium halide-aluminum alkyl catalyst system.

The normally hydrocarbon soluble metallocenes and alumoxanes are converted to a relatively hydrocarbon insoluble solid reaction product by contacting said metallocenes and alumoxanes in a suitable solvent. The order of addition in contacting the metallocene and alumoxane can vary. For example, the metallocene (neat or dissolved in a suitable solvent) can be first added to the reaction vessel followed by the addition thereto of the alumoxane; the alumoxane and metallocene can be added to the reaction vessel simultaneously; the alumoxane can be first added to the reaction vessel followed by the addition of the metallocene. In accordance with the preferred embodiment of this invention the metallocene dissolved in a suitable inert hydrocarbon solvent is added to a stirred solution of the alumoxane.

The preparation of the metallocene-alumoxane reaction product, as mentioned above, is conducted in an inert solvent, preferably a hydrocarbon solvent in which the metallocene and alumoxane are soluble. Preferred solvents include mineral oils and the various hydrocarbons which are liquid at reaction temperatures and in which the individual ingredients are soluble. Illustrative examples of useful solvents include the alkanes such as pentane, iso-pentane, hexane, heptane, octane, nonane, and the like; cycloalkanes such as cyclopentane, cyclohexane, and the like; and aromatics such as benzene, toluene, ethylbenzene, diethylbenzene, and the like.

The solid catalyst prepared in accordance with this invention is generally sparingly soluble at ambient temperatures in aromatic solvents, insoluble in aliphatic solvents and decomposes in polar solvents.

Preferably, the metallocene is dissolved in a hydrocarbon in which the reaction product of the alumoxane and metallocene is largely insoluble such as pentane. The amount of solvent to be employed can vary over a wide range without a deleterious effect of the reaction. In accordance with the preferred embodiment of this invention, the amount of solvent to be employed is enough to completely dissolve the metallocene and alumoxane independently prior to addition.

The metallocene and alumoxane can be added to the reaction vessel rapidly or slowly. The temperature maintained during the contact of the reactants can vary widely, such as, for example, from about $-78°$ C. to about $50°$ C. Greater or lesser temperatures can also be employed. Preferably, the alumoxanes and metallocenes are contacted at $0°$ C. temperature. The reaction between the alumoxane and the metallocene is rapid, and hence the reaction between the alumoxane and the metallocene is maintained for about 2 to 60 minutes. Preferably, the reaction is maintained for about 15 minutes at subambient temperatures. The reaction of the alumoxane and the metallocene is evidenced by the color change and formation of a precipitate or oil.

At all times, the individual ingredients as well as the recovered catalyst are protected from oxygen and moisture. Therefore, the reactions must be performed in an oxygen and moisture free atmosphere and recovered in an oxygen and moisture free atmosphere. Preferably, therefore, the reaction is performed in the presence of an inert dry gas such as, for example, helium or nitrogen. The recovered solid catalyst can be maintained in a nitrogen atmosphere, preferably a subambient temperature.

The reaction products of the metallocene and alumoxane which are generally solid materials when produced in aliphatic solvents and oils when produced in aromatic solvents can be recovered by any well-known technique. For example, the solid material can be recovered from the liquid by vacuum filtration or decantation. The oils can be recovered by decantation, and when dried, became glassy solids. The recovered material is thereafter dried under a stream of pure dry nitrogen, dried under vacuum, or by any other convenient manner. The recovered solid is a catalytically active material.

The solid can be usefully employed in gas phase polymerization, slurry oolymerization, or in solution polymerization.

The amount of alumoxane and metallocene usefully employed in preparation of the solid catalyst component can vary over a wide range. To obtain a stable solid the mole ratio of alumoxane to metallocene must be greater than 12:1, such as about 12:1 to about 100:1. Ratios in the range of 20–40:1 are desirable, however, the greater amounts can be usefully employed. The solid obtained will have an aluminum to transition metal ratio in the range of about 12 to 100 moles of aluminum per mole of metal and preferably 12 to 30 moles of aluminum per mole of metal. The solid so obtained has excellent catalytic activity with resoect to olefin polymerization while employing significantly lower ratios of aluminum to transition metal as compared to the homogeneous systems, whereby polymerization is carried out by adding the alumoxane and metallocene independently to the reactor.

The present invention employs at least one metallocene compound in the formation of the solid catalyst. Metallocene, i.e. a cyclopentadienylide, is a metal derivative of a cyclopentadiene. The metallocenes usefully employed in accordance with this invention contain at least one cyclopentadiene ring. The metal is selected from Group IVB, VB, VIB, and VIII metal, preferably IVB and VB metal, preferably titanium, zirconium, hafnium, chromium, and vanadium, and especially titanium and zirconium. The cyclopentadienyl ring can be unsubstituted or contain substituents such as, for example, a hydrocarbyl substituent. The metallocene can contain one, two, or three cyclopentadienyl rings however two rings are preferred.

The preferred metallocenes can be represented by the general formulas:

$$(Cp)_m MR_n X_q \qquad\qquad I.$$

wherein Cp is a cyclopentadienyl ring, M is a Group IVB, VB, VIB, or VIII transition metal, R is a hydrocarbyl group or hydrocarboxy having from 1 to 20 carbon atoms, X is a halogen, and m=1-3, n=0-3, q=0-3 and the sum of m+n+q is equal to the oxidation state of the metal. The metal is most preferably in its highest formal oxidation state.

$$(C_5R'_k)_g R''_s (C_5R'_k) MQ_{3-g} \text{ and} \qquad II,$$

$$R''_s(C_5R'_k)_2 MQ' \qquad\qquad III.$$

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$-$C_6$ ring. R'' is a $C_1$-$C_4$ alkylene radical, a dialkyl germanium or silicon, or a alkyl phosphine or amine radical bridging two $(C_5R'_k)$ rings, Q is a hydrocarbyl radical such as aryl, alkyl, alkenyl, alkylaryl, or aryl alkyl radical having from 1-20 carbon atoms, hydrocarboxy radical having from 1-20 carbon atoms or halogen and can be the same or different from each other, Q' is an alkylidiene radical having from 1 to about 20 carbon atoms, s is 0 or 1, g is 0, 1 or 2, s is 0 when g is 0, k is 4 when s is 1 and k is 5 when s is 0, and M is as defined above.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like.

Exemplary halogen atoms include chlorine, bromine, fluorine and iodine and of these halogen atoms, chlorine is preferred.

Exemplary hydrocarboxy radicals are methoxy, ethoxy, propoxy, butoxy, amyloxy and the like.

Exemplary of the alkylidiene radicals is methylidene, ethylidene and propylidene.

Illustrative, but non-limiting examples of the metallocenes represented by formula I are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium di-methyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide, bis(cyclopentadienyl)methyl iodide, bis(cyclopentadienyl)titanium ethyl bromide, bis(cyclopentadienyl)titanium ethyl iodide, bis(cyclopentadienyl)titanium phenyl bromide, bis(cyclopentadienyl)titanium phenyl iodide, bis(cyclopentadienyl)zirconium methyl bromide, bis(cyclopentadienyl)zirconium methyl iodide, bis(cyclopentadienyl)zirconium ethyl bromide, bis(cyclopentadienyl)zirconium ethyl iodide, bis(cyclopentadienyl)zirconium phenyl bromide, bis(cyclkpentadienyl)zirconium phenyl iodide; the trialkyl metallocenes such as cyclopentadienyltitanium trimethyl, cyclopentadienyl zirconium triphenyl, and cyclopentadienyl zirconium trineopentyl, cyclopentadienylzirconium trimethyl, cyclopentadienylhafnium triphenyl, cyclopentadienylhafnium trineopentyl, and cyclopentadienylhafnium trimethyl.

Illustrative, but non-limiting examples of II and III metallocenes which can be usefully employed in accordance with this invention are monocyclopentadienyls titanocenes such as, pentamethylcyclopentadienyl titanium trichloride, pentaethylcyclopentadienyl titanium trichloride; bis(pentamethylcyclopentadienyl) titanium diphenyl, the carbene represented by the formula bis(cyclopentadienyl)titanium=$CH_2$ and derivatives of this reagent such as bis(cyclopentadienyl)Ti=CH$_2 \cdot$Al(CH$_3$)$_3$, (Cp$_2$TiCH$_2$)$_2$, Cp$_2$TiCH$_2$CH(CH$_3$)CH$_2$, Cp$_2$Ti-CHCH$_2$CH$_2$; substituted bis(cyclopentadienyl)titanium (IV) compounds such as: bis(indenyl)titanium diphenyl or dichloride, bis(methylcyclopentadienyl)titanium diphenyl or dihalides; dialkyl, trialkyl, tetraalkyl and penta-alkyl cyclopentadienyl titanium compounds such as bis(1,2-dimethylcyclopentadienyl)titanium diphenyl or dichloride, bis(1,2-diethylcyclopentadienyl)titanium diphenyl or dichloride and other dihalide complexes; silicon, phosphine, amine or carbon bridged cyclopentadiene complexes, such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes and the like.

Illustrative but non-limiting examples of the zirconocenes Formula II and III which can be usefully employed in accordance with this invention are, pentamethylcyclopentadienyl zirconium trichloride, pentaethylcyclopentadienyl zirconium trichloride, bis(pentamethylcyclopentadienyl)zirconium diphenyl, the alkyl substituted cyclopentadienes, such as bis(ethyl cyclopentadienyl)zirconium dimethyl, bis($\beta$-phenylpropylcyclopentadienyl)zirconium dimethyl, bis(methylcyclopentadienyl)zirconium dimethyl, bis(n-butyl cyclopentadienyl)zirconium dimethyl, bis(cyclohexylmethylcyclopentadienyl)zirconium dimethyl, bis(n-octyl-cyclopentadienyl)zirconium dimethyl, and haloalkyl and dihalide complexes of the above; di-alkyl, trialkyl, tetra-alkyl, and penta-alkyl cyclopentadienes, such as bis(pentamethylcyclopentadienyl) zirconium dimethyl, bis(1,2-dimethylcyclopentadienyl)zirconium dimethyl and dihalide complexes of the above; silicone, phosphorus, and carbon bridged cyclopentadiene complexes such as dimethylsilyldicyclopentadienyl zirconium dimethyl or dihalide, and methylene dicyclopentadienyl zirconium dimethyl or dihalide, and methylene dicyclopentadienyl zirconium dimethyl or dihalide, carbenes represented by the formula $Cp_2Zr=CHP(C_6H_5)_2CH_3$, and derivatives of these compounds such as $Cp_2ZrCH_2CH(CH_3)CH_2$.

Bis(cycopentadienyl)hafnium dichloride, bis(cyclopentadienyl)hafnium dimethyl, bis(cyclopentadienyl)vanadium dichloride and the like are illustrative of other metallocenes.

The polymerization may be conducted by a solution, slurry, or gas-phase technique, generally at a temperature in the range of about 0°–160° C. or even higher, and under atmospheric, subatmospheric, or superatmospheric pressure conditions; and conventional polymerization adjuvants, such as hydrogen may be employed if desired. It is generally preferred to use the catalyst compositions at a concentration such as to provide about 0.00005–0.01%, most preferably about 0.005–0.001%, by weight of transition metal (100 g metal.g$^{-1}$ diluent)

A slurry polymerization process can utilize sub- or superatmospheric pressures and temperatures in the range of 40°–110° C. In a slurry polymerization, a suspension of solid, particulate polymer is formed in a liquid polymerization medium to which ethylene, alphaolefin comonomer, hydrogen and catalyst are added. The liquid employed as the polymerization medium can be an alkane or cycloalkane, such as butane, pentane, hexane, or cyclohexane, or an aromatic hydrocarbon, such as toluene, ethylbenzene or xylene. The medium employed should be liquid under the conditions of the polymerization and relatively inert. Preferably, hexane or toluene is employed.

In a slurry phase polymerization, the alkyl aluminum scavenger is preferably dissolved in a suitable solvent, typically in an inert hydrocarbon solvent such as toluene, xylene, and the like in a molar concentration of about $1 \times 10^{-3}$M. However, greater or lesser amounts can be used.

A gas-phase polymerization process utilizes superatmospheric pressure and temperatures in the range of about 50°–120° C. Gas-phase polymerization can be performed in a stirred or fluidized bed of catalyst and product particles in a pressure vessel adapted to permit the separation of product particles from unreacted gases. Thermostated ethylene, comonomer, hydrogen and an inert diluent gas such as nitrogen can be introduced or recirculated so as to maintain the particles at a temperature of 50°–120° C. Trimethylaluminum may be added as needed as a scavenger of water, oxygen and other adventitious impurities. Polymer product can be withdrawn continuously or semicontinuing at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal. The polymer obtained can be extruded into water and cut into pellets or other suitable comminuted shapes. Pigments, antioxidants and other additives, as is known in the art, may be added to the polymer.

The molecular weight of polymer product obtained in accordance with this invention can vary over a wide range, such as low as 500 up to 2,000,000 or higher and preferably 1,000 to about 500,000.

For the production of polymer product having a narrow molecular weight distribution, it is preferable to employ only one metallocene in forming the solid catalyst with the alumoxane. For broad molecular weight distribution or broad compositional distribution polymer one employs two or more metallocenes in forming the solid catalyst.

It is highly desirable to have for many applications, such as extrusion and molding processes, polyethylenes which have a broad molecular weight distribution of the unimodal and/or the multimodal type. Such polyethylenes evidence excellent processability, i.e. they can be processed at a faster throughout rate with lower energy requirements and at the same time such polymers would evidence reduced melt flow perturbations. Such polyethylenes can be obtained by providing a catalyst component comprising at least two different metallocenes, each having different propagation and termination rate constants for ethylene polymerizations. Such rate constants are readily determined by one of ordinary skill in the art.

The molar ratio of the metallocenes, such as, for example, of a zirconocene to a titanocene in such catalysts, can vary over a wide range, and in accordance with this invention, the only limitation on the molar ratios is the breadth of the Mw distribution or the degree of bimodality desired in the product polymer. Desirably, the metallocene to metallocene molar ratio will be about 1:1 to about 100:1, and preferably 1:1 to about 10:1.

The present invention also provides a process for producing (co)polyolefin reactor blends comprising polyethylene and copoly- ethylene-alpha-olefins. The reactor blends are obtained directly during a single polymerization process, i.e., the blends of this invention are obtained in a single reactor by simultaneously polymerizing ethylene and copolymerizing ethylene with an alpha-olefin thereby eliminating expensive blending operations. The process of producing reactor blends in accordance with this invention can be employed in conjunction with other prior art blending techniques, for example, the reactor blends produced in a first reactor can be subjected to further blending in a second stage by use of the series reactors.

In order to produce reactor blends the catalyst comprises at least two different metallocenes each having different comonomer reactivity ratios.

The comonomer reactivity ratios of the metallocenes in general are obtained by well known methods, such as for example, as described in "Linear Method for Determining Monomer Reactivity Ratios in Copolymerization", M. Fineman and S. D. Ross, J. Polymer Science 5, 259 (1950) or "Copolymerization", F. R. Mayo and C. Walling, Chem. Rev. 46, 191 (1950) incorporated herein in its entirety by reference. For example, to determine reactivity ratios the most widely used copolymerization model is based on the following equations:

$$M_1^* + M_1 \xrightarrow{k_{11}} M_1^* \quad (1)$$

$$M_1^* + M_2 \xrightarrow{k_{12}} M_2^* \quad (2)$$

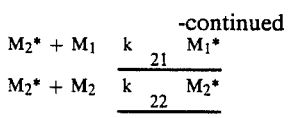

where $M_1$ refers to a monomer molecule which is arbitrarily designated i (where i=1, 2) and $M_i^*$ refers to a growing polymer chain to which monomer i has most recently attached.

The kij values are the rate constants for the indicated reactions. In this case, $k_{11}$ represents the rate at which an ethylene unit inserts into a growing polymer chain in which the previously inserted monomer unit was also ethylene. The reactivity rates follow as: $r_1 = k_{11}/k_{12}$ and $r_2 = k_{22}/k_{21}$ wherein $k_{11}$, $k_{12}$, $k_{22}$ and $k_{21}$ are the rate constants for ethylene (1) or comonomer (2) addition to a catalyst site where the last polymerized monomer is ethylene ($k_{1x}$) or comonomer (2) ($k_{2x}$).

Since, in accordance with this invention, one can produce high viscosity polymer product at a relatively high temperature, temperature does not constitute a limiting parameter as with the prior art metallocene/alumoxane catalyst. The catalyst systems described herein, therefore, are suitable for the polymerization of olefins in solution, slurry or gas phase polymerizations and over a wide range of temperatures and pressures. For example, such temperatures may be in the range of about $-60°$ C. to about $280°$ C. and especially in the range of about $0°$ C. to about $160°$ C. The pressures employed in the process of the present invention are those well known, for example, in the range of about 1 to 500 atmospheres, however, higher pressures can be employed.

The polymers produced by the process of this present invention are capable of being fabricated into a wide variety of articles, as is known for homopolymers of ethylene and copolymers of ethylene and higher alpha-olefins. The present invention is illustrated by the following examples.

EXAMPLES

In the Examples following the elemental analysis was obtained through inductively coupled plasma emission spectroscopy on a Jarrell Ash Spectrometer Model 750 manufactured by Jarrell Ash.

Bis(pentamethylcyclopentadienyl)zirconium bis-triflate was manufactured by dissolving 2 grams of bis(pentamethylcyclopentadienyl)zirconium dimethyl in 100 ml of toluene and cooling to $-30°$ C. To the cooled solution was added 1.53 grams of triflic acid ($CF_3SO_3H$). The reaction was stirred for one hour and the solid was isolated by filtration. The crude product was recrystallized from dichloromethane and diethyl ether yielding 2.8 grams of yellow prisms characterized by NMR spectroscopy (Varian XL200) to be bis-penamethylcyclopentadienyl-zirconium-bis-triflate. 1.0 grams of the recovered complex was suspended in 50 ml of toluene under constant stirring to which was added 0.11 g of trimethylaluminum. The solid reaction product began immediately to dissolve. Reaction was continued for 30 minutes, upon which the solvent was removed in vacuo. The recovered product was recrystallized from toluene-pentane to yield 0.80 grams of yellow crystals characterized by proton and carbon NMR spectroscopy (Varian XL200) to be bis-pentamethylcyclopentadienyl-zirconium-methyl-triflate.

The alumoxane employed was prepared by adding 76.5 grams ferrous sulfate heptahydrate in 4 equally spaced increments over a 2 hour period to a rapidly stirred 2 liter round-bottom flask containing 1 liter of a 13.1 wt. % solution of trimethylaluminum (TMA) in toluene. The flask was maintained at $50°$ C. and under a nitrogen atmosphre. Methane produced was continuously vented. Upon completion of the addition of ferrous sulfate heptahydrate the flask was continuously stirred and maintained at a temperature of $50°$ C. for 6 hours. The reaction mixture was cooled to room temperature and was allowed to settle. The clear solution containing the alumoxane was separated by decantation from the insoluble solids.

In cases where the metallocene of interest is readily soluble in a saturated hydrocarbon such as pentane, it is desirable to have the methylalumoxane dissolved in that same solvent. Pentane solutions of alumoxane are prepared by concentrating a toluene solution of alumoxane (prepared as above) in vacuo to a clear viscous oil (i.e., where most of the toluene has been removed but prior to the point where a solid glass is formed). This oil is extracted with pentane to remove all pentane soluble aluminum components. The pentane solubles are separated from high molecular weight insoluble alumoxane oligomers by filtration, and analyzed for aluminum concentration by ICPES.

EXAMPLE 1

Catalyst Preparation

To a 0.5 liter reaction flask containing 1 gram of bis(pentamethylcyclopentadienyl)zirconium dichloride dissolved in 75 ml of toluene, there was added with constant stirring and at room temperature, 198 ml of a pentane solution 0.35M in methylalumoxane. A reaction occurred immediately as evidenced by the formation of an insoluble yellow-oil. The reaction flask was cooled to $-30°$ C. and held at that temperature for one hour. The oil was separated from the mother liquor by decantation, washed with 30 ml of pentane and dried in vacuo yielding 1.47 grams of a glassy solid (Solid I). The aluminum:zirconium ratio was 33:1.

Polymerization

Solid I (0.05 g) was dissolved in 100 ml of toluene, injected into a 250 ml pressure reaction vessel and heated to $80°$ C. The vessel was pressured to 35 psi with ethylene and maintained for 20 minutes at $80°$ C. with constant stirring. 4.4 grams of high-density polyethylene was isolated.

EXAMPLE 2

Catalyst Preparation

To a 0.25 liter reaction flask containing 0.75 grams of bis(pentamethylcyclopentadienyl)zirconium dimethyl dissolved in 50 ml of toluene, there was added with constant stirring and at room temperature, 164 ml of a pentane solution 0.35 M in methylalumoxane. A reaction occurred immediately, yielding a yellow oil. The reaction flask was cooled to $-30°$ C. and held at that temperature for one hour. The oil was separated from the mother liquor, washed with 50 ml of pentane, and dried in vacuo, yielding 1.3 grams of a glassy solid (Solid II). The aluminum:zirconium ratio was 32:1.

Polymerization

Solid II (0.05 g) was dissolved in 100 ml toluene, injected into a 250 ml pressure reaction vessel and heated to $80°$ C. The vessel was pressured to 35 psi with ethylene and maintained for 20 minutes at $80°$ C. with constant stirring. 5.4 grams of high density polyethylene was recovered.

EXAMPLE 3

Catalyst Preparation

To a 0.25 liter reaction flask containing 1 gram of bis(nbutylcyclopentadienyl)zirconium dichloride dissolved in 75 ml of a 20:80 mixture of toluene and pentane, there was added with constant stirring, and at room temperature, 176 ml of methylalumoxane (0.35M). The reaction vessel was cooled to −30° C. and held at the temperature for one hour. The oil was separated from the mother liquor by decantation, washed with 20 ml of pentane, and dried in vacuo yielding 1.87 grams of a glassy solid (Solid III). The aluminum:zirconium ratio was 20:1.

Polymerization

Solid III (0.05 g) was dissolved in 100 ml toluene, injected into a 250 ml reaction vessel and heated to 80° C. The vessel was pressured to 35 psi with ethylene and maintained for 10 minutes at 80° C. with constant stirring. 8.2 grams of high density polyethylene was isolated.

EXAMPLE 4

Catalyst Preparation

To a 0.25 liter reaction flask containing 0.50 grams of bis(cyclopentadienyl)titanium methyl chloride dissolved in 75 ml of toluene, there was added with constant stirring and at room temperature, 156 ml of a pentane solution 0.35 M in methylalumoxane. A chemical reaction occurred as evidenced by the immediate formation of a deep red oil. The reaction vessel was cooled to −30° C. and held at that temperature for a one hour period. The oil was separated from the mother liquor by decantation, washed with 50 ml pentane, and dried in vacuo, yielding 2.78 grams of a glassy solid (Solid IV). The aluminum:titanium ratio was 20:1.

Polymerization

Solid IV (0.05 g) was dissolved in 100 ml of toluene, injected into a 250 ml pressre reaction vessel and heated to 80° C. The vessel was pressured to 35 psi with ethylene and maintained for 20 minutes at 80° C. with constant stirring. 3.8 grams of high density polyethylene was isolated.

EXAMPLE 5

Catalyst Preparation

To a 0.25 liter reaction flask containing 0.71 grams of bis(pentamethylcyclopentadienyl)zirconium-methyltriflate dissolved in 100 ml of toluene, there was added, with constant stirring and at room temperature, 97 ml of a pentane solution 0.35 M of methylalumoxane. A reaction occurred immediately as evidenced by the formation of an insoluble yellow oil. The reaction vessel was cooled to −30° C. and held at that temperature for one hour. The oil was separated from the mother liquor by decantation, washed in 50 ml of pentane and dried in vacuo, yielding 1.80 grams of a glassy solid (Solid V). The aluminum:zirconium ratio was 68:1.

Polymerization

Solid V (0.05 g) was dissolved in 100 ml of toluene, injected into a 250 ml pressure reaction vessel and heated to 80° C. The vessel was pressured to 35 psi with ethylene was maintained for 20 minutes at 80° C. and with constant stirring. 3.2 grams of polyethylene was isolated.

EXAMPLE 6

Catalyst Preparation

To a 0.25 liter reaction flask containing 1 gram of bis(pentamethylcyclopentadienyl)titanium dichloride dissolved in 60 ml of toluene there was added, with constant stirring and at room temperature, 80 ml of a pentane solution 0.79 M in methylalumoxane. A reaction occurred immediately as evidenced by the formation of a sparingly soluble deep red oil. The reaction vessel was cooled to −30° C. and held at that temperature for one hour. The oil was separated from the mother liquor, washed in 50 ml of pentane and dried in vacuo, yielding 1.95 grams of a glassy solid (Solid VI). The aluminum:titanium ratio was 17:1.

Polymerization

Solid VI (0.05 g) was dissolved in 100 ml of toluene, injected into a 250 ml pressure reaction vessel and heated to 80° C. The vessel was pressured to 35 psi with ethylene and maintained for 20 minutes at 80° C. with constant stirring. 0.9 gram of polyethylene was isolated.

EXAMPLE 7

Catalyst Preparation

To a 0.25 liter reaction flask containing 0.75 grams of bis(nbutylcyclopentadienyl)titanium dichloride dissolved in 100 ml of an 80:20 mixture of pentane and toluene there was added, with constant stirring and at room temperature, 66 ml of a pentane solution 0.35 M in methylalumoxane. A reaction occurred immediately as evidenced by the formation of an insoluble red oil. The reaction vessel was cooled to −30° C. and held at that temperature for one hour. The oil was separated from the mother liquor, washed in 50 ml of pentane and dried in vacuo, yielding 0.75 grams of a glassy solid (Solid VII). The aluminum:titanium ratio was 24:1.

Polymerization

Solid VII (0.05 g) was dissolved in 100 ml of toluene, injected into a 250 ml pressure reaction vessel and heated to 80° C. The vessel was pressured to 35 psi with ethylene and maintained for 20 minutes at 80° C. with stirring. 3.2 grams of high density polyethylene was isolated.

EXAMPLE 8

Catalyst Preparation

To a 0.25 liter reaction flask containing 1 gram of bis(cyclopentadienyl)titanium diphenyl dissolved in 100 ml of an 80:20 mixture of pentane and toluene there was added, with constant stirring and at room temperature, 95 ml of a pentane solution 0.79M in methylalumoxane. A reaction occurred immediately forming an insoluble oil. The reaction vessel was cooled to −30° C. and held at that temperature for one hour. The oil was separated from the mother liquor, washed in 50 ml of pentane and dried in vacuo, yielding 0.70 grams of a glassy solid (Solid VIII). The aluminum:titanium ratio was 17:1.

Polymerization

Solid VIII (0.05 g) was dissolved in 100 ml of toluene, injected into a 250 ml pressure reaction vessel and heated to 80° C. The vessel was pressured to 35 psi with ethylene and maintained for 20 minutes at 80° C. with constant stirring. 2.9 grams of high density polyethylene was isolated.

EXAMPLE 9

Catalyst Preparation

To a 0.25 liter reaction flask containing 0.5 grams of bis(cyclopentadienyl)zirconium dimethyl dissolved in 100 ml of a 90:10 mixture of pentane and toluene there was added, with constant sitrring and at room temperature, 63 ml of a pentane solution 0.79M in methylalumoxane. A reaction occurred immediately as evidenced by the formation of an off-white precipitate. The reaction vessel was cooled to $-30°$ C. and held at that temperature for one hour. The precipitate was collected by filtration, washed with 50 ml of pentane and dried in vacuo, yielding 1.9 grams of a white solid (Solid IX). The aluminum:zirconium ratio was 21.7:1.

Polymerization

Solid IX (0.05 g) was dissolved in 100 ml of toluene, injected into a 250 ml pressure reaction vessel and heated to 80° C. The vessel was pressurized to 35 psi with ethylene and maintained for 10 minutes at 80° C. with constant stirring. 7.2 grams of high density polyethylene was isolated.

What is claimed is:

1. A method for preparing polymers of ethylene and copolymers of ethylene and alpha-olefins or diolefins said method comprising effecting polymerization by contacting ethylene or a mixture of ethylene and alpha-olefins or diolefins with an olefin polymerization catalyst comprising the hydrocarbon insoluble reaction product of at least one metallocene of a metal of group IV B, VB, VI B and VIII of the Periodic Table with an alumoxane at a ratio of 1:12 to about 1:100 on a molar basis based on the metal and aluminum.

2. The method of claim 1 wherein the metallocene is selected from titanium, zirconium, hafnium, and vanadium metallocenes and mixtures thereof.

3. The method of claim 1 wherein the metallocene is selected from titanium and zirconium metallocenes and mixtures thereof.

4. The method of claim 1 wherein the alumoxane is methyl alumoxane.

5. The method of claim 1 wherein the ratio is in the range of 12:1 to 30:1.

6. The method of claim 1 wherein the metallocenes of represented by the formulas $$(Cp)_m MR_n X_q \qquad \text{I,}$$

$$(C_5R'_k)_g R''_s (C_5R'_k) MQ_{3-g} \text{ and} \qquad \text{II,}$$

$$R''_s (C_5R'_k)_2 MQ' \qquad \text{III,}$$

wherein Cp is a cyclopentadienyl ring, M is a Group IVB, VB, VIB, or VIII transition metal, R is a hydrocarbyl group or hydrocarboxy having from 1 to 20 carbon atoms, X is a halogen, $m=1-3$, $n=0-3$, $q=0-3$ and the sum of $m+n+q$ is equal to the oxidation state of M, $(C_5R'_k)$ is a cyclopentadienyl or a substituted cyclopentadienyl; each R' is the same or different and is hydrogen or a hydrocarbyl radical selected from alkyl, alkenyl aryl, alkylaryl and arylalkyl radicals containing from 1 to 20 carbon atoms, or two carbon atoms are joined together to form a $C_4$-$C_6$ ring, R'' is a $C_1$-$C_4$ alkylene radical, a dialkyl germanium or silicon or an alkyl phosphine or amine radical bridging two $(C_5R'_k)$ rings; Q is a hydrocarbyl radical selected from aryl, alkyl, alkenyl, alkylaryl, and arylalkyl radicals having from 1-20 carbon atoms, hydrocarboxy radical having from 1-20 carbon atoms or halogen and can be the same or different from each other; Q' is an alkylidiene radical having from 1 to about 20 carbon atoms; s is 0 or 1; g is 0, 1, or 2; s is 0 when g is 0; k is 4 when s is 1 and k is 5 when s is 0.

7. The method of claim 1 wherein the metallocenes are selected from from bis(cyclopentadienyl)zirocnium dichloride, bis(cyclopentadienyl)zirconium methyl chloride, bis(cyclopentadienyl)zirconium dimethyl, bis(methylcyclopentadieneyl)zirconium dichloride, bis(methylcyclopentadienyl)zirconium methyl chloride, bis(methylcyclopentadienyl)zirconium dimethyl, bis(pentamethylcyclopentadienyl)zirconium dichloride, bis(pentamethylcyclopentadienyl)zirconium methyl chloride, bis(pentamethylcyclopentadienyl)zirconium dimethyl, bis(n-butyl-cyclopentadienyl)zirconium dichloride, bis(n-butyl-cyclopentadienyl)zirconium methyl chloride, bis(n-butyl-cyclopentadienyl)zirconium dimethyl, bis(cyclopentadienyl)titanium diphenyl, bis(cyclopentadienyl)titanium dichloride, bis(cyclopentadienyl)titanium methyl chloride, bis(cyclopentadienyl)titanium dimethyl, bis(methylcyclopentadienyl)titanium diphenyl, bis(methylcyclopentadienyl)titanium dichloride, bis(methylcyclopentadienyl)titanium diphenyl, bis(methylcyclopentadienyl)titanium methyl chloride, bis(methylcyclopentadienyl)titanium dimethyl, bis(pentamethylcyclopentadienyl)titanium dichloride, bis(pentamethylcyclopentandienyl)titanium diphenyl, bis(pentamethylcyclopentadienyl)titanium methyl chloride, bis(pentamethylcyclopentadienyl)titanium dimethyl, bis(n-butyl-cyclopentadienyl)titanium diphenyl, bis(n-butyl-cyclopentadienyl)titanium dichloride and mixtures thereof.

8. The method of claim 1 wherein the catalyst is prepared by reacting at least one metallocene in a solvent in an amount sufficient to dissolve completely the metallocene with an alumoxane in a solvent in an amount sufficient to dissolve completely the alumoxane.

* * * * *